(12) United States Patent
Gummin et al.

(10) Patent No.: US 11,753,125 B2
(45) Date of Patent: Sep. 12, 2023

(54) SHAPE MEMORY ALLOY ACTUATOR FOR INFLATION DEVICE

(71) Applicants: Mark A. Gummin, Silverton, OR (US); Brian Joseph Stasey, Fishers, IN (US)

(72) Inventors: Mark A. Gummin, Silverton, OR (US); Brian Joseph Stasey, Fishers, IN (US)

(*) Notice: Subject to any disclaimer, the term of this patent is extended or adjusted under 35 U.S.C. 154(b) by 141 days.

(21) Appl. No.: 17/351,411

(22) Filed: Jun. 18, 2021

(65) Prior Publication Data

US 2022/0055722 A1 Feb. 24, 2022

Related U.S. Application Data

(60) Provisional application No. 63/123,309, filed on Dec. 9, 2020, provisional application No. 63/069,636, filed on Aug. 24, 2020.

(51) Int. Cl.
*B63C 9/19* (2006.01)
*B63C 9/125* (2006.01)
*B63C 9/00* (2006.01)

(52) U.S. Cl.
CPC ............... *B63C 9/19* (2013.01); *B63C 9/125* (2013.01); *B63C 9/1255* (2013.01); *B63C 2009/0023* (2013.01); *F17C 2205/0326* (2013.01)

(58) Field of Classification Search
CPC ......... B63C 9/19; B63C 9/125; B63C 9/1255; B63C 2009/0023; F17C 2205/0326
See application file for complete search history.

(56) References Cited

U.S. PATENT DOCUMENTS

| | | |
|---|---|---|
| 3,008,479 A | 11/1961 | Mancusi |
| 3,579,964 A | 5/1971 | Ohlstein |
| 3,597,780 A | 8/1971 | Coyle |
| 4,046,157 A | 9/1977 | Cazalla et al. |
| 4,232,417 A | 11/1980 | Miller et al. |
| 4,493,664 A * | 1/1985 | Dale .............. B63B 22/003 367/4 |
| 5,076,468 A | 12/1991 | Mackal |
| 5,509,576 A | 4/1996 | Weinheimer et al. |
| 6,260,570 B1 | 7/2001 | Wass et al. |
| 7,232,354 B2 | 6/2007 | Olson et al. |
| 7,669,616 B2 | 3/2010 | Bruengger |

(Continued)

FOREIGN PATENT DOCUMENTS

| | | |
|---|---|---|
| WO | WO 2020/037355 A1 | 2/2020 |
| WO | WO 2021/023758 A1 | 2/2021 |

*Primary Examiner* — Andrew Polay

(57) ABSTRACT

An inflation device is provided including a shell, a pin, a restraining element, and a moveable element. The shell is adapted to be coupled to an inflation canister. The pin is positioned within the shell. The pin is adapted to open a seal of the inflation canister. The restraining element is positioned within the shell. The moveable element includes a shape memory alloy. The moveable element is moveable from a first position to a second position responsive to electrical energy sent to the moveable element. While the moveable element is in the first position, the restraining element is secured within the shell to restrain the pin from opening the seal of the inflation canister. While the moveable element is in the second position, the pin is releasable to open the seal of the inflation canister.

20 Claims, 8 Drawing Sheets

(56) References Cited

U.S. PATENT DOCUMENTS

| | | |
|---|---|---|
| 7,988,511 B2 | 8/2011 | Bissell et al. |
| 8,826,931 B2 | 9/2014 | Clark et al. |
| 8,881,521 B2 | 11/2014 | Browne et al. |
| 9,045,207 B2 | 6/2015 | Anderson et al. |
| 9,879,950 B2 | 1/2018 | Moon et al. |
| 2008/0146105 A1 | 6/2008 | Haselsteiner |
| 2020/0247513 A1 | 8/2020 | Garner et al. |

* cited by examiner

SHAPE MEMORY ALLOY ACTUATOR FOR INFLATION DEVICE

CROSS-REFERENCE TO RELATED APPLICATIONS

This application claims priority of Provisional Application Ser. No. 63/069,636 filed Aug. 24, 2020, entitled "Shape Memory Alloy Wire Initiated Gas Cartridge Piercing System." This application also claims priority of Provisional Application Ser. No. 63/123,309 filed Dec. 9, 2020, entitled "Low Cost Electronic Initiators for Dissolving Pill Automatic Inflators."

TECHNICAL FIELD

This disclosure relates to actuators for use in inflation devices for inflating floatation devices such as life vests, buoys, rafts, and similar items, and in particular, to control mechanisms to prevent unintended actuation of inflation devices.

BACKGROUND

The statements in this section merely provide background information related to the present disclosure and may not constitute prior art.

Pressurized gas canisters are often used to inflate objects such as life vests, buoys, rafts, and other inflatable devices. Frequently, inflatable devices include a mechanism to automatically open a pressurized canister to allow inflation under certain conditions, such as the presence of water or a certain water pressure. For example, these mechanisms frequently include a dissolvable bobbin or a paper seal positioned to restrain a spring-biased piercing pin from puncturing a frangible seal of a pressurized gas canister. However, these mechanisms sometimes actuate in unintended circumstances, such as in high humidity conditions while in storage, when splashed, or when it is raining.

Systems which prevent unintended actuation may be costly or unreliable. For example, a piercing pin may be restrained by a linkage which is melted by resistance heat from electrical energy. However, the linkage typically must be large enough to restrain a piercing pin capable of delivering 50 pounds of static force to a frangible seal. In such inflation devices, a large amount of electrical energy and/or a large amount of time is typically needed to melt the linkage. Such a device may be excessively expensive, may require a large energy source to activate, or may take too much time to operate in a time-critical situation.

Other systems utilize multiple sensors linked to microprocessors to control valves and ports to control the actuation of the inflation device. Such systems may be reliable but require a large amount of electrical energy to operate, requiring larger, bulkier batteries. Such systems may be also expensive due to the cost of the sensors and microprocessors. Therefore, an actuator which requires a small amount of electrical energy would be cheaper, lighter, and more compact: and is therefore desirable. Furthermore, a reliable actuator which prevents unintended inflation is also desirable.

SUMMARY

Further areas of applicability will become apparent from the description provided herein. It should be understood that the description and specific examples are intended for purposes of illustration only and are not intended to limit the scope of the present disclosure.

In one embodiment, an inflation device is provided including a shell, a pin, a restraining element, and a moveable element. The shell is adapted to be coupled to an inflation canister. The pin is positioned within the shell. The pin is adapted to open a seal of the inflation canister. The restraining element is positioned within the shell. The moveable element includes a shape memory alloy. The moveable element is moveable from a first position to a second position responsive to electrical energy sent to the moveable element. While the moveable element is in the first position, the restraining element is secured within the shell to restrain the pin from opening the seal of the inflation canister. While the moveable element is in the second position, the pin is releasable to open the seal of the inflation canister.

In yet another embodiment, an inflation device is provided including a shell, a pin, and a moveable element. The shell is adapted to be coupled to an inflation canister. The pin is positioned within the shell. The pin is adapted to open a seal of the inflation canister. The moveable element includes a shape memory alloy. The moveable element is moveable from a first position to a second position responsive to electrical energy sent through the moveable element. While the moveable element is in the first position, the pin is restrained from opening the seal of the inflation canister. While the moveable element is in the second position, the pin is releasable to open the seal of the inflation canister.

In another embodiment, a method of activating an inflation device is provided. The inflation device includes an inflation canister, a shell, a pin, a restraining element, and a moveable element. The shell is coupled to the inflation canister. The pin is positioned within the shell and is adapted to open a seal of the inflation canister. The restraining element is secured within the shell to restrain the pin from opening the seal. The moveable element includes a shape memory alloy. The method includes supplying electrical energy through the shape memory alloy of the moveable element, moving the moveable element from a first position to a second position responsive to the electrical energy, unsecuring the restraining element within the shell, and releasing the pin to open the seal of the inflation canister.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

Figure 1:
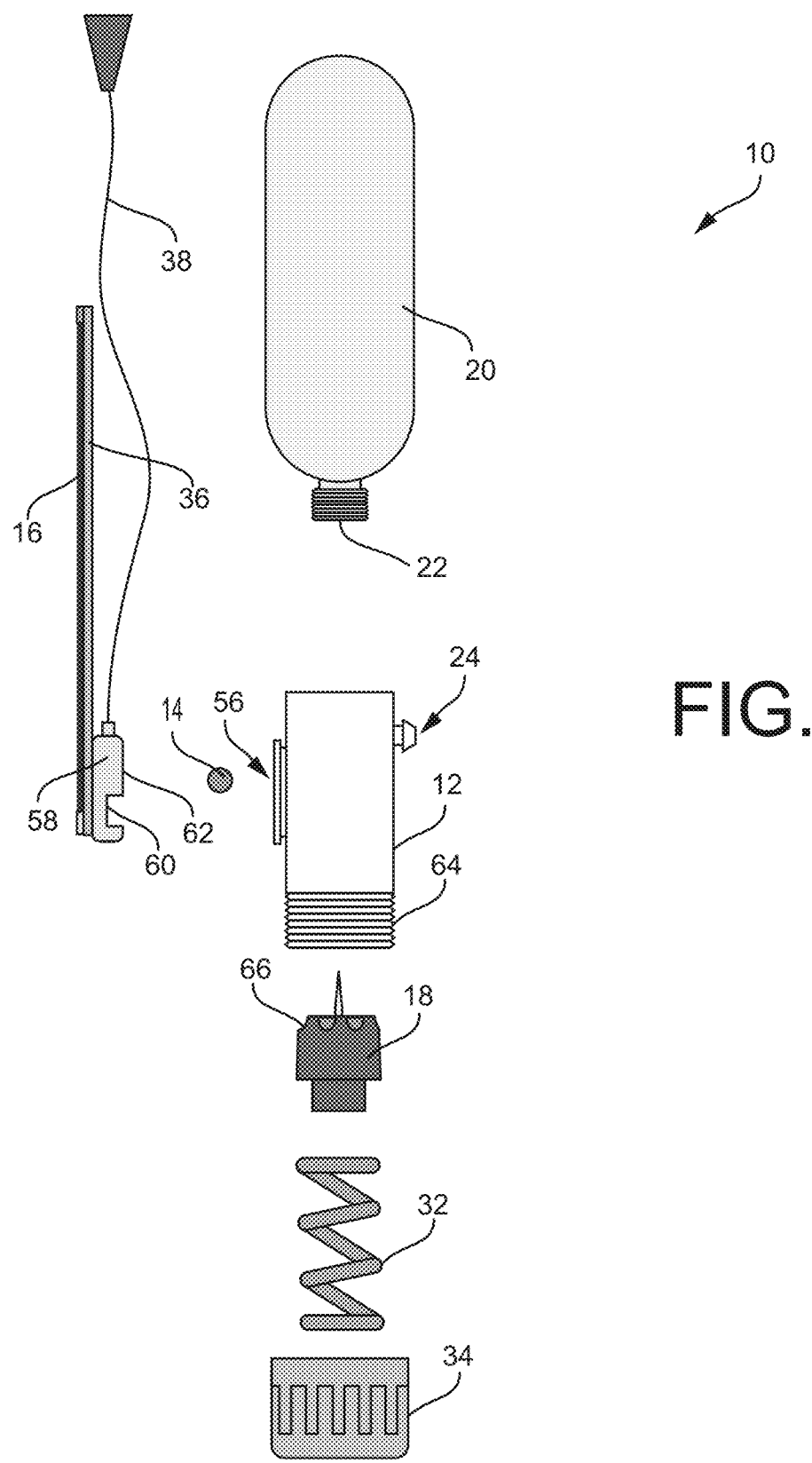
FIG. 1 illustrates an exploded cross-sectional side view of a first example of an inflation device, including a shell, a pin, a restraining element, and a moveable element.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In one example, an inflation device is provided including a shell, a pin, a restraining element, and a moveable element. The shell is adapted to be coupled to an inflation canister. The pin is positioned within the shell. The pin is adapted to open a seal of the inflation canister. The restraining element is positioned within the shell. The moveable element includes a shape memory alloy. The moveable element is moveable from a first position to a second position responsive to electrical energy sent to the moveable element. While the moveable element is in the first position, the restraining element is secured within the shell to restrain the pin from opening the seal of the inflation canister. While the moveable element is in the second position, the pin is releasable to open the seal of the inflation canister.

One technical advantage of the systems and methods described below may be that an inflation device described herein may be substantially cheaper than other inflation devices. The inflation device described below may require only a small amount of electrical energy and may therefore operate with a relatively small battery, typically requiring no more 10 joules (e.g. 1 watt for 10 second, 10 watts for 1 second, etc.). Comparatively, other, expensive inflation devices may include microprocessors, multiple sensors, or high-power melting wires, all of which require a larger battery, and which raises the cost of the actuator. Furthermore, the inflation device described below may include fewer and cheaper parts than existing inflation devices, reducing the comparative cost of the inflation device.

Another technical advantage of the systems and methods described below may be that the inflation devices described herein may be substantially more reliable than other inflation devices. The inflation devices described herein may prevent unintended actuation by protecting dissolvable components until a desired pre-condition has been met. Other inflation devices may not protect dissolvable components and may therefore activate at undesirable times, such as during storage in high humidity conditions. Furthermore, the inflation device described below may include fewer parts and have fewer mechanical linkages between moving parts of the inflation device, reducing the opportunities for mechanical failure and improving reliability of the inflation device.

Yet another technical advantage of the systems and methods described below may be that the inflation devices described herein may activate more quickly and more reliably when needed when compared with other inflation devices. Typically, self-inflating floatation devices, must inflate within 10 seconds of encountering the water, ideally within less than 5 seconds. The inflation devices described herein require only a small amount of electrical energy and only need to function for a short period of time in order to operate. Additionally, the inflation devices described herein have a small number of simple components which decreases the chance that a critical component may fail when needed. Comparatively, some inflation devices require too much amount of time and/or energy in order to fully operate (e.g., by melting a thick restraining component). Additionally, some other inflation devices incorporate complex parts such as delicate sensors and microprocessors which may become non-functional with rough use.

FIG. 1 illustrates an exploded cross-sectional side view of a first example of an inflation device 10 including an inflation canister 20, a shell 12, a piercing pin 18, a restraining element 14, a moveable element 16, a biasing mechanism 32, and a cap 34. The inflation device 10 may be any device which may be used to automatically inflate a floatation device such as a life vest, buoy, or raft. Examples of the inflation device 10 may include a pump or a mechanism for releasing a canister of compressed fluid. The inflation canister 20 may be any component which is capable of supplying fluid, such as air or another gas, for inflation of a floatation device. Examples of the inflation canister 20 may include a tube of compressed air; a cylinder of compressed carbon dioxide, or a pump supplying atmospheric air. The inflation canister 20 may include a seal 22 over an outlet of the inflation canister 20. The seal 22 may be any part of the inflation canister 20 which may be easily broken, pierced, or otherwise removed, to allow fluid from the inflation canister 20 inflate a floatation device. The seal 22 may require between 30-60 pounds, but typically 50 pounds of static force to open. The size of the inflation canister 20 may vary but may have a weight of roughly 20 grams.

The shell 12 may be any portion of the inflation device 10 which may be coupled to the inflation canister 20 and which contains at least some of the components of inflation device 10. Examples of the shell 12 may include a cylinder, a tube, or a box. The shell 12 may have an interior 50 defined by a wall (46 in FIG. 6). The components of the inflation device 10 may be positioned within the interior (50 in FIG. 2). The shell 12 may be made of any material capable of holding components of the inflation device 10, such as metal or plastic.

The wall 46 of the shell 12 may define an inflation port 24 proximate to the inflation canister 20. The inflation port 24 may be any opening in the wall 46 of the shell 12 through which fluid may escape from the inflation canister 20 to inflate a floatation device. The wall 46 of the shell 12 may also define a locking port 56 through which the restraining element 14 may travel between the interior (50 in FIG. 2) of the shell 12 and the exterior of the shell 12. In some embodiments, the locking port 56 may not allow the restraining element 14 to travel completely outside of the shell 12 and may instead be a groove or channel to prevent the restraining element 14 from occluding the path of the piercing pin 18.

The piercing pin 18 may be any component of the inflation device 10 which is capable of piercing or otherwise opening the seal 22 of the inflation canister 20. Examples of the piercing pin 18 may include a javelin-tipped needle, a blade, or even a contact-actuated explosive device. The piercing pin 18 may be positioned within the interior 50 of the shell 12 proximate to the seal 22 of the inflation canister 20. Although the un-actuated position of the piercing pin 18 may vary, typically, the un-actuated piercing pin 18 may be positioned approximately 0.1 inches from the seal 22 of the inflation canister 20. Therefore, the work product needed to pierce the seal 22 may be approximately 5.0 inch-pounds. The piercing pin 18 may also interact with the wall 46 of the shell 12 to isolate the inflation port 24 from the water ports 26 of the shell 12, preventing water from entering the floatation device, and preventing the inflation fluid from exiting the inflation device 10 except through the inflation port 24.

The restraining element 14 may be any component which may be positioned within the interior 50 of the shell 12 to prevent the piercing pin 18 from piercing the seal 22 of the inflation canister 20. Examples of the restraining element 14 may include a ball bearing, a donut, a pill, or a bobbin.

The biasing mechanism 32 may be any component which biases the piercing pin 18 towards advancement onto the seal 22 of the inflation canister 20, either directly or indirectly. Examples of biasing mechanism 32 may include a spring, a lever, or a piston. As shown in FIG. 1, the biasing mechanism 32 may be a spring which is maintained in compressive tension between the piercing pin 18 and the cap 34 while the inflation device 10 is in the unactuated position. When the restraining element 14 is removed or unsecured, the biasing mechanism 32 may expand, generating the force necessary for the piercing pin 18 to pierce the seal 22.

The cap 34 may be any component of the inflation device 10 which is coupled to the shell 12 and the biasing mechanism 32. In some embodiments, the cap 34 may be threaded to be screwed onto a matching threaded surface 64 on the shell 12 such that the force stored in the biasing mechanism 32 may be adjusted by rotating the cap 34 relative to the shell 12. In some embodiments, the cap 34 may also seal the interior 50 of the shell 12 from unintended infiltration of water or other fluids.

The restraining element 14 may be any component which may be arranged within the interior 50 of the shell 12 to prevent the piercing pin 18 from opening the seal 22 of the inflation canister 20. For example, the restraining element 14 may be a ball bearing, a plate, a cylinder, or a bobbin. The restraining element 14 may be made of any material sufficiently rigid to prevent the piercing pin 18 from opening the seal 22, such as plastic or metal. In some embodiments, the restraining element 14 may be at least partially dissolvable such that when exposed to water, the restraining element 14 may structurally collapse to allow the piercing pin 18 to advance and open the seal 22.

The moveable element 16 may be any component which is moveable from a first position to a second position responsive to an electrical energy sent to the moveable element 16. Examples of the moveable element 16 may include a wire, a lever, or a coil. The moveable element 16 may be made of a shape memory alloy, such as Nitinol, Ferro Silicon Manganese, or Copper Aluminum Nickel, which changes shape, such as shrinking or expanding, when heated. Electrical energy sent through the moveable element 16 may cause the shape memory alloy to heat due to internal electrical resistance, moving the moveable element 16 from the first position to the second position.

The moveable element 16 may be arranged on a board 36. The board 36 may be any component which houses at least a portion of the moveable element 16. Examples of the board may include a semi-conductive substrate, an electrically non-conductive box, or a housing.

The moveable element 16 may include a slider 58. The slider 58 may be any component which interacts with the restraining element 14 and which moves as the moveable element 16 moves from the first position to the second position. The slider 58 may include a barrier portion 62 and a recess portion 60. The barrier portion 62 may be any portion of the slider 58 which is adapted to restrict the movement of the restraining element 14 while the moveable element 16 is in the first position. Examples of the barrier portion 62, may include a wall, a bulge, or a biasing mechanism. The recess portion 60 may be any portion of the slider 58 which is adapted to enable the movement of the restraining element 14 while the moveable element 16 is in the second position. Examples of the recess portion 60 may include a wall, a recess, or a crevice.

The inflation device 10 may also include a manual pull-tab 38. The manual pull-tab 38 may be any component which may be used to manually activate or allow activation of the inflation device 10. Examples of the manual pull-tab 38 may include a string, a lanyard, or a switch. The manual pull-tab 38 may force the moveable element 16 from the first position into the second position. Alternatively, the manual pull-tab 38 may bypass the moveable element 16 altogether. For example, in some embodiments, the manual pull-tab 38 may be coupled to the slider 58. Exerting force on the manual pull-tab 38 may move the slider 58 independently from the moveable element 16 in order to allow activation of the inflation device 10.

Figure 2:
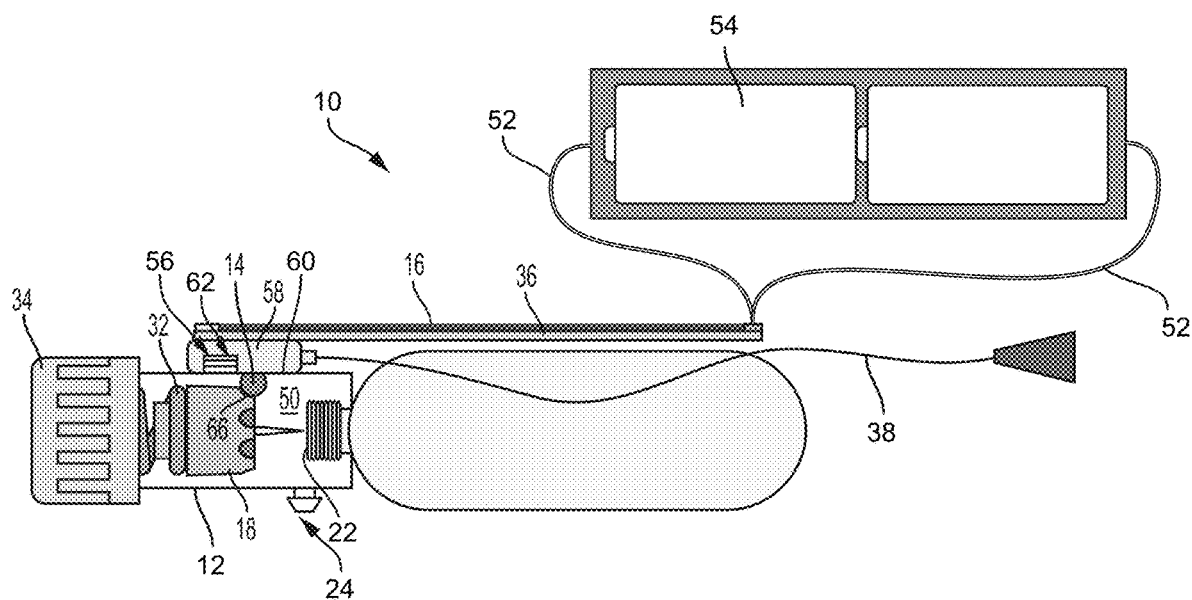
FIG. 2 illustrates a cross-sectional side view of a second example of an inflation device, including a shell, a pin, a restraining element, a moveable element in a first position, and an energy source.
Figure 3:
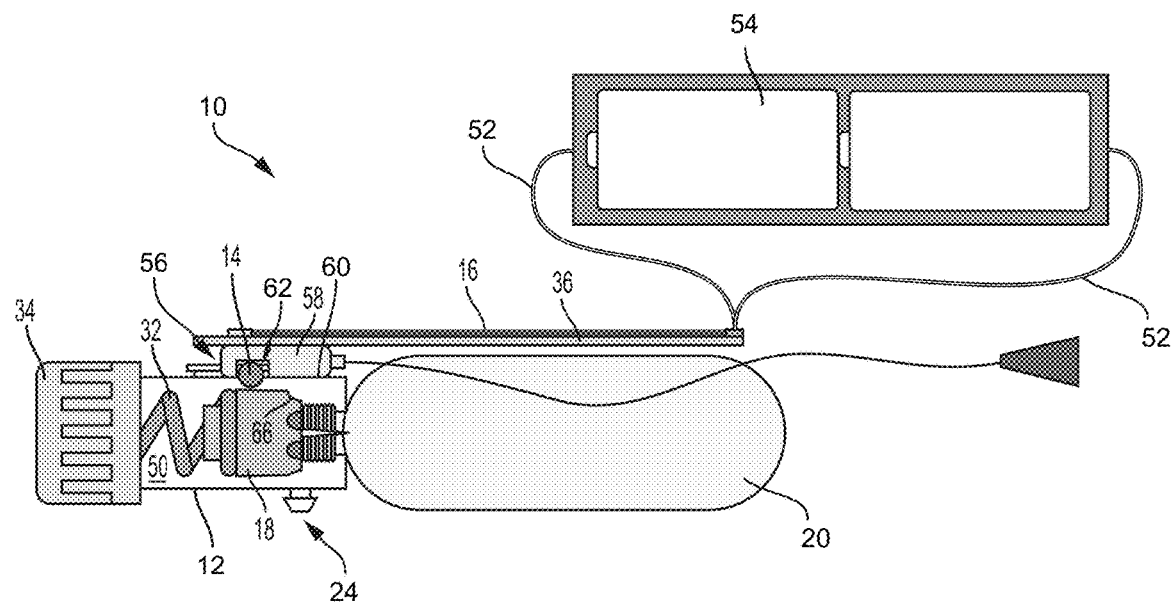
FIG. 3 illustrates a cross-sectional side view of the second example of an inflation device, including a shell, a pin, a restraining element, a moveable element in a second position, and an energy source.

FIG. 2 illustrates a cross-sectional side view of an example of the inflation device 10 while the moveable element 16 is in the first position. FIG. 3 illustrates a cross-sectional side view of the example of the inflation device 10 from FIG. 2, while the moveable element 16 is in the second position. In some embodiments, while in the first position, the restraining element 14 may be positioned in the interior 50 of the shell 12 to restrain the advancement of the piercing pin 18. The restraining element 14 may be secured between the wall 46 of the shell 12 partially within the locking port 56, and a catch surface 66 of the piercing pin 18. The catch surface 66 may be any portion of the piercing pin which rests against the restraining element 14 while the moveable element 16 in the first position and which pushes the restraining element 14 to clear the path of the piercing pin 18 while the moveable element is in the second position. Examples of the catch surface 66 may include a sloped surface or a concave curved surface.

While the moveable element 16 is in the first position, translation of the restraining element 14 through the locking port 56 may be restrained by the barrier portion 62 of the slider 58. While the moveable element 16 is in the first position, the barrier portion 62 may at least partially cover the locking port 56. In such a situation, the restraining element 14 may be restrained against the barrier portion 62.

The inflation device 10 may include an electrical energy source 54 coupled to the moveable element 16 through electrical wires 52. The electrical energy source 54 may be any component which may selectively apply electrical energy to the moveable element 16 to move the moveable element from the first position to the second position. Examples of the electrical energy source 54 may include a battery or an external power supply. In some embodiments, the electrical energy source 54 may be one or more AAA dry-cell battery or one or more 3-volt CR2032 Lithium coin cell battery. The electrical energy source 54 may be positioned within the shell 12, may be coupled to the exterior of the shell 12, or may be separated apart from the shell 12. In some embodiments, the electrical energy source 54 may only be required to provide no more than 20 joules of electrical energy (but ideally no more than 10 joules) over no more than 1 second to allow quick actuation of the inflation device 10. In some embodiments, such as where the electrical energy source 54 is capable of providing only a small electrical current, other components may be used to convert the electrical energy from the electrical energy source 54 to a higher voltage current.

After heating from the electrical energy from activation of the electrical energy source 54, the moveable element 16 may move from the first position to the second position. While in the second position, the moveable element 16 may cause the slider 58 to move as well. In such a position, the recess portion 60 of the slider 58 may be positioned alongside the locking port 56 to allow translation of the restraining element 14 through the locking port 56 and at least partially out of the interior 50 of the shell 12. The force exerted from the biasing mechanism 32 on the piercing pin 18, as well as the angle of the catch surface of the piercing pin 18, may force the restraining element 14 to translate out of the interior 50 of the shell 12. Additionally, once the restraining element 14 is no longer restraining the piercing pin 18, the biasing mechanism 32 may force the piercing pin 18 to open the seal 22 of the inflation canister, causing actuation of the inflation device 10.

Figure 4:
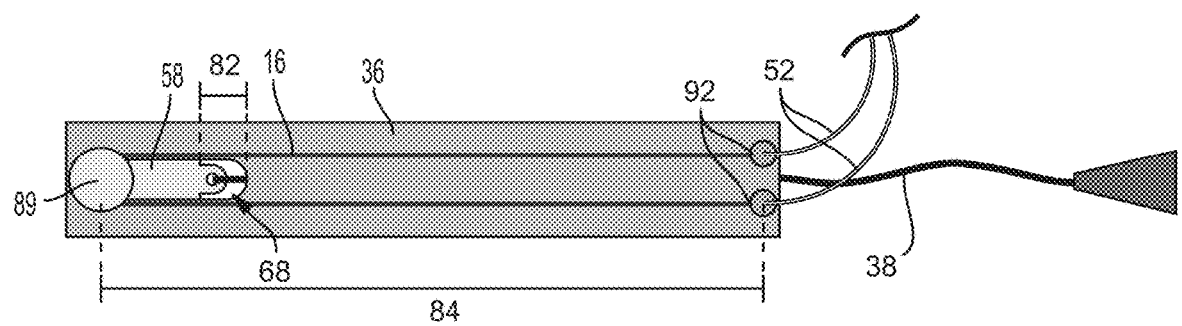
FIG. 4 illustrates a top-down plan view of an example of a moveable element in a first position.
Figure 5:
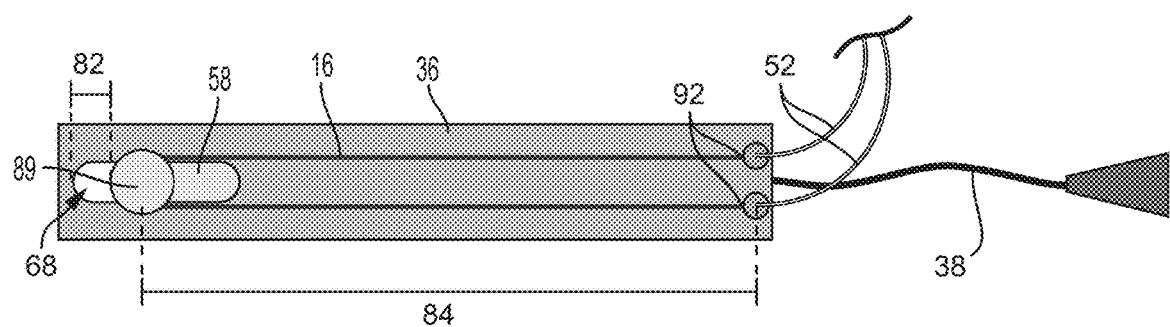
FIG. 5 illustrates a top-down plan view of the example of a moveable element in a second position.

FIG. 4 illustrates a plan view of an example of the moveable element 16 in the first position. FIG. 5 illustrates a plan view of the example of the moveable element 16 from FIG. 4 in the second position. In some embodiments, the moveable element 16 may include a single shape alloy wire coupled to electrical wires 52 at two ends 92 and folded at an apex 89 of an arc to form a U-shape on the board 36. The apex 89 of the arc may be coupled to the slider 58. The slider 58 may be positioned within a slot 68 in the board 36 which confines the movement of the slider 58 to a moveable distance 82 within the slot 68.

As the moveable element 16 heats due to electrical resistance, the moveable element 16 may contract uniformly along the length of the shape memory alloy wire, causing a length 84 between the apex 89 and the ends 92 of the moveable element 16 to contract. For example, when the moveable element 16 is heated to 150 deg F, the shape memory alloy wire may contract 0.4 millimeter per centimeter of total initial length of the shape memory alloy wire. This contraction from the first position to the second position may also force the slider 58 to move the length of its moveable distance 82 within the slot 68. In some embodiments, the length 84 between the apex 89 and the ends 92 of the moveable element 16 may be no more than twenty-five times the moveable distance 82 of the slider 58.

Other arrangements of the moveable element 16 are possible. For example, the moveable element 16 may be a shape memory alloy wire extended in a single strand having a first end coupled to the slider 58 and a second end coupled to an electrical wire 52. Such an arrangement may require more length 84 between the first end and the second end to meet the same moveable distance 82 for the slider 58 as shown in FIGS. 4 and 5. Alternatively, the moveable element 16 may be a shape memory alloy wire folded into a sequential U-shaped pattern, having at least one apex 89 coupled to the slider 58. Such an arrangement may require less length 84 between the apex 89 and the ends 92 to meet the same moveable distance 82 for the slider 58 as shown in FIGS. 4 and 5.

Figure 6:
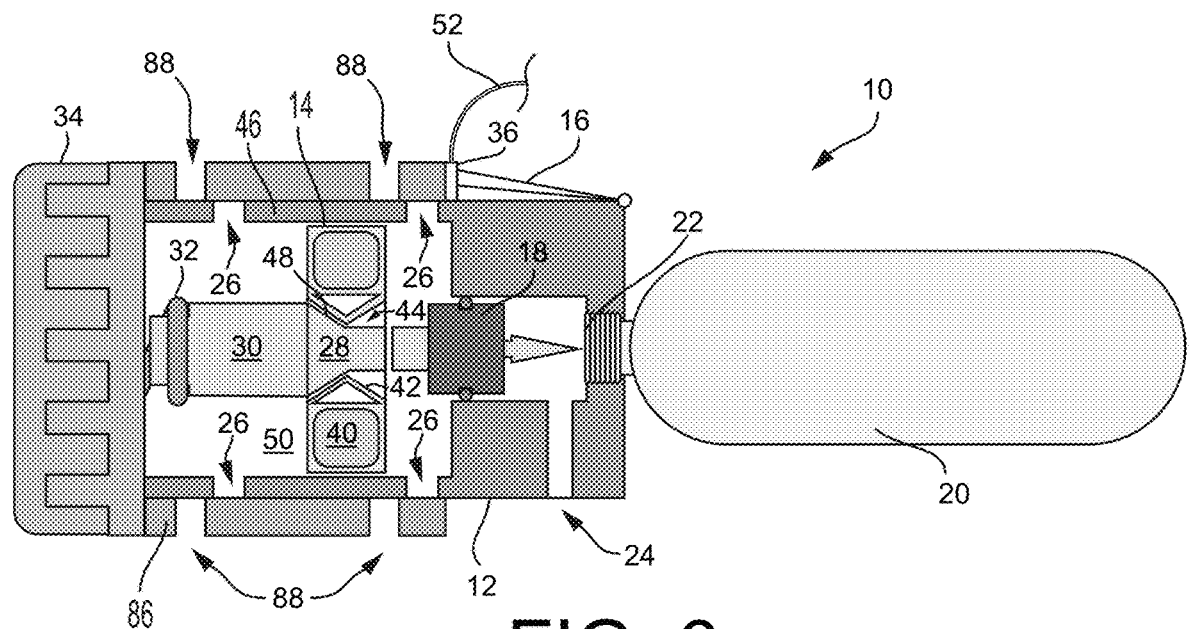
FIG. 6 illustrates a cross-sectional side view of a third example of an inflation device, including a shell, a pin, a restraining element, a moveable element in a first position, and an energy source.
Figure 7:
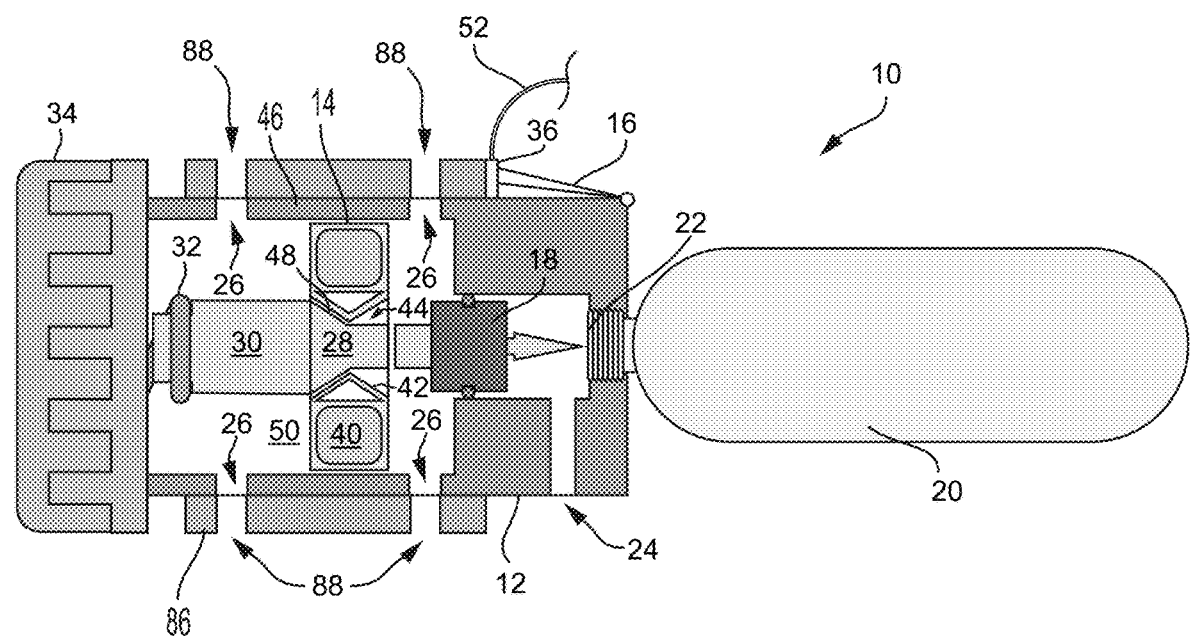
FIG. 7 illustrates a cross-sectional side view of the third example of an inflation device, including a shell, a pin, a restraining element, a moveable element in a second position, and an energy source.

FIG. 6 illustrates a cross-sectional side view of an example of the inflation device 10 while the moveable element 16 is in the first position. FIG. 7 illustrates a cross-sectional side view of the example of the inflation device 10 from FIG. 6, while the moveable element 16 is in the second position. As illustrated in FIGS. 6 and 7, the wall 46 of the shell 12 may also define one or more water ports 26. The water port 26 may be any opening in the wall 46 of the shell 12 through which water can enter the interior 50 of the shell 12. As illustrated, some embodiments of the inflation device 10 may include a striker pin 30 and a transfer pin 28 positioned within the shell 12, as well as a sleeve 86 surrounding the exterior of the shell 12.

The wall 46 may define between 1 and 4 water ports to allow water to quickly enter the interior 50 of the shell 12 when needed. In some embodiments, multiple water ports 26 on multiple opposing sides of the shell 12 may be desirable to allow water to enter the interior 50 when needed and also to allow and residual air to escape from the interior 50. A single water port 26 on a single side of the shell 12 could cause a back pressure of residual air within the interior 50, depending on the orientation of the shell 12, thereby preventing water from effectively entering the interior 50 and dissolving the restraining element 14.

As discussed above, in some embodiments, the restraining element 14 may be a dissolvable bobbin. In such embodiments, the body of the restraining element 14 may be made of a material 40 which may be dissolvable to allow actuation of the inflation device 10 once the material 40 of the restraining element 14 has at least partially dissolved. The material 40 of the restraining element 14 may be made of any dissolvable material, such as paper, cellulose, or polyvinyl alcohol. In some embodiments, the restraining element 14 may be positioned between water ports 26 to allow rapid dissolution of the restraining element 14 when needed.

The restraining element 14 may have an interior surface 42 which is shaped to define an opening 44 through the center, or near the center of the restraining element 14. The transfer pin 48 may be any component which may fit into this opening 44 and which may be used to force the piercing pin 18 to open the seal 22 of the inflation canister 20. Advancement of the transfer pin 48 onto the piercing pin 18 may be prevented by the transfer pin 48 resting against the interior surface 42 of the restraining element 14. For example, the interior surface 42 of the restraining element 14 may be sloped to interact with a matching sloping surface of the transfer pin 48, such that when the restraining element 14 at least partially dissolves, the transfer pin 48 may be advanced through the opening 44 of the restraining element 14 and onto the piercing pin 18.

The striker pin 30 may be any component of the inflation device 10 which is positioned within the interior 50 of the shell 12 to force the advancement of the transfer pin 28 and thereby advance the piercing pin 18 into the seal 22 of the inflation canister 20. Examples of the striker pin 30 may include a bolt or a lug. While the inflation device 10 is in the unactuated position, the striker pin 30 may rest on the restraining element 14, prevented from contacting or advancing the transfer pin 28. Once the restraining element has been unsecured, the striker pin 30 may advance, forcing the transfer pin 28 through the restraining element 14 and onto the piercing pin 18 to open the seal 22.

The sleeve 86 may be any component of the inflation device 10 which extends around at least a portion of the exterior of the shell 12. Examples of the sleeve 86 may include a cylinder, a column, or a wrapper. The sleeve 86 may be positioned to seal the exterior of the shell 12, such that while the moveable element 16 is in the first position, the sleeve 86 may seal the water ports 26 of the shell 12, preventing fluid intrusion into the interior 50 of the shell 12. The sleeve 86 may also include sleeve ports 88 which pass through the sleeve 86. When the sleeve ports 88 are aligned with the water ports 26, fluid may pass through into the interior 50 of the shell 12. When the sleeve ports 88 are unaligned with the water ports 26, the sleeve ports 88 may be sealed against the wall 46 of the shell 12.

In such an embodiment, the moveable element 16 may be arranged to translate the position of the sleeve 86 relative to the shell 12. For example, in one embodiment, the board 36 may be coupled to the sleeve 86. The moveable element 16 may be a shape memory alloy wire having ends 92 coupled to the board 36 and looped with the apex 89 coupled to a point on the shell 12. Heating of the moveable element 16 through electrical resistance may cause the moveable element 16 to contract, translating the position of the sleeve 86 and the sleeve ports 88. While the moveable element 16 is in the first position, the sleeve ports 88 may be sealed against the shell 12. While the moveable element 16 is in the second position, the sleeve 86 may be translated to align the sleeve ports 88 with the water ports 26. After such alignment has occurred, fluid may enter the interior 50 of the shell 12, dissolving the restraining element 14, and allowing the piercing pin 18 to open the seal 22.

Figure 8:
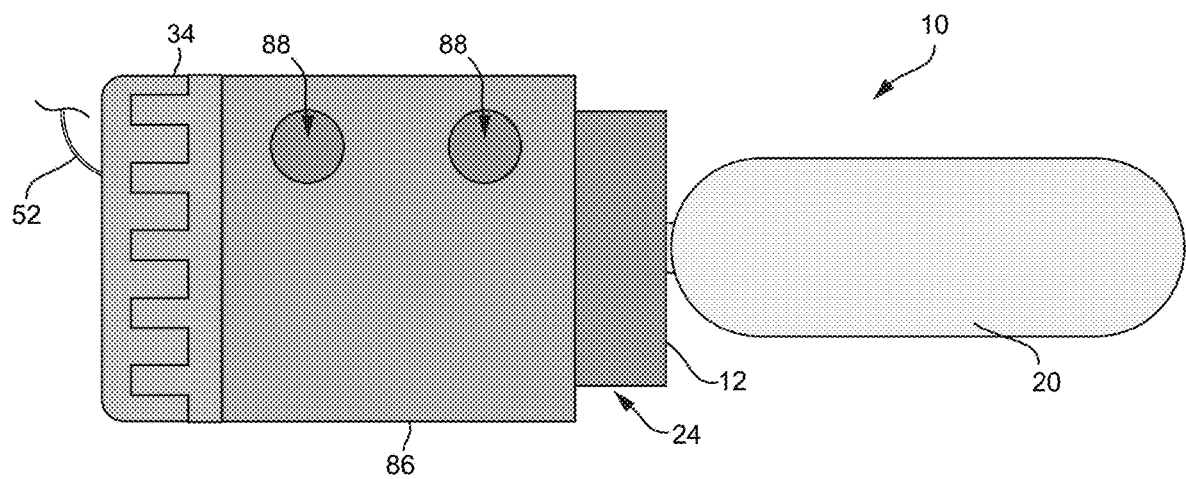
FIG. 8 illustrates a cross-sectional side view of a fourth example of an inflation device, including a shell, a pin, a restraining element, a moveable element in a first position, and an energy source.
Figure 9:
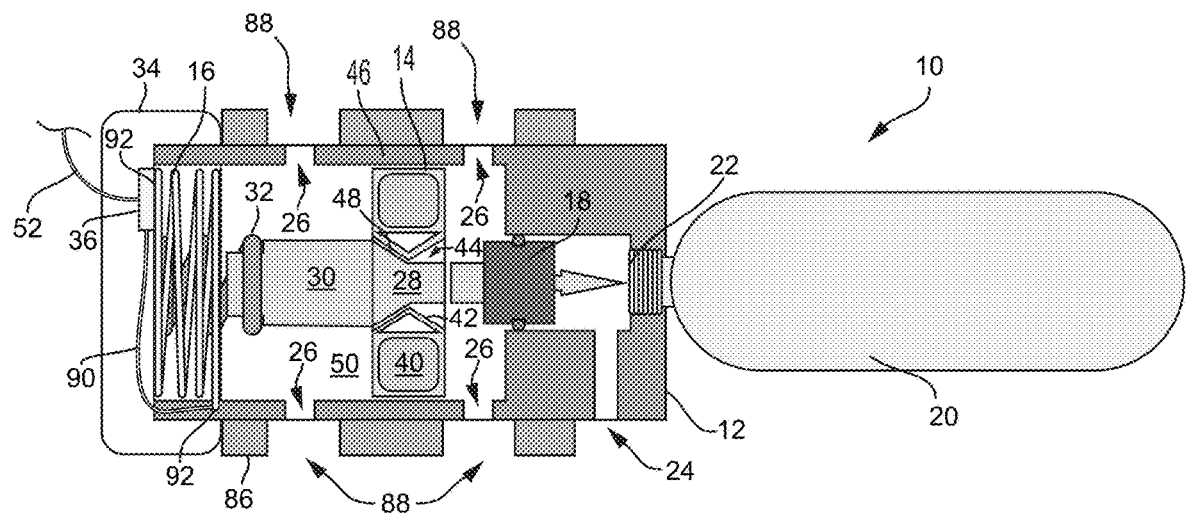
FIG. 9 illustrates a cross-sectional side view of the fourth example of an inflation device, including a shell, a pin, a restraining element, a moveable element in a second position, and an energy source.

FIG. 8 illustrates a cross-sectional side view of an example of the inflation device 10 while the moveable element 16 is in the first position. FIG. 9 illustrates a cross-sectional side view of the example of the inflation device 10 from FIG. 8, while the moveable element 16 is in the second position. In some embodiments, the sleeve 86 may rotate to align the sleeve ports 88 and the water ports 26. In such an embodiment, the moveable element 16 may be arranged to facilitate this rotation. In such an embodiment, a first end 92 of the moveable element 16 may be coupled to the shell 12. A second end 92 of the moveable element 16 may be connected to one of the cap 34 or the sleeve 86. In such an embodiment, the moveable element 16 made be a coiled shape memory alloy wire arranged proximate to the cap 34 within the interior 50 of the shell 12. Expansion or contraction of the moveable element 16 from heating due to electrical resistance may cause the ends 92 of the moveable element 16 to rotate relative to one another, thereby causing rotation between the shell 12 and the sleeve 86. In an embodiment where one end 92 of the moveable element is coupled to the cap 34, the cap 34 may be coupled to the sleeve 86 to allow rotation of the sleeve 86 as the cap 34 also rotates.

As illustrated in FIG. 8, while the moveable element 16 is in the first position, the sleeve ports 88 may be sealed against the shell 12. While the moveable element 16 is in the second position, the sleeve 86 may be rotated to align the sleeve ports 88 with the water ports 26. After such alignment has occurred, fluid may enter the interior 50 of the shell 12, dissolving the restraining element 14, and allowing the piercing pin 18 to open the seal 22.

A return wire 90 may also be present to complete the circuit for the moveable element 16. For example, the board 36 and electrical wires 52 may be coupled to the cap 34 and to only one end 92 of the moveable element 16. Therefore, to complete the electrical circuit, the return wire 90 may be coupled to the board 36 and to the electrically unattached end 92 of the moveable element 16.

Figure 10:
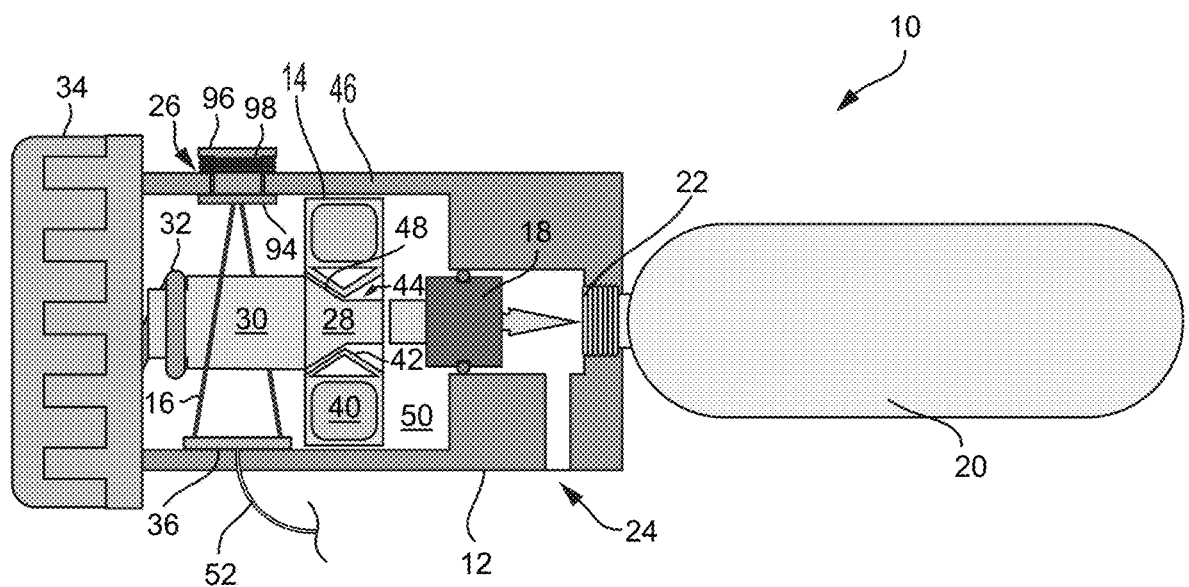
FIG. 10 illustrates a cross-sectional side view of a fifth example of an inflation device, including a shell, a pin, a restraining element, a moveable element in a first position, and an energy source.
Figure 11:
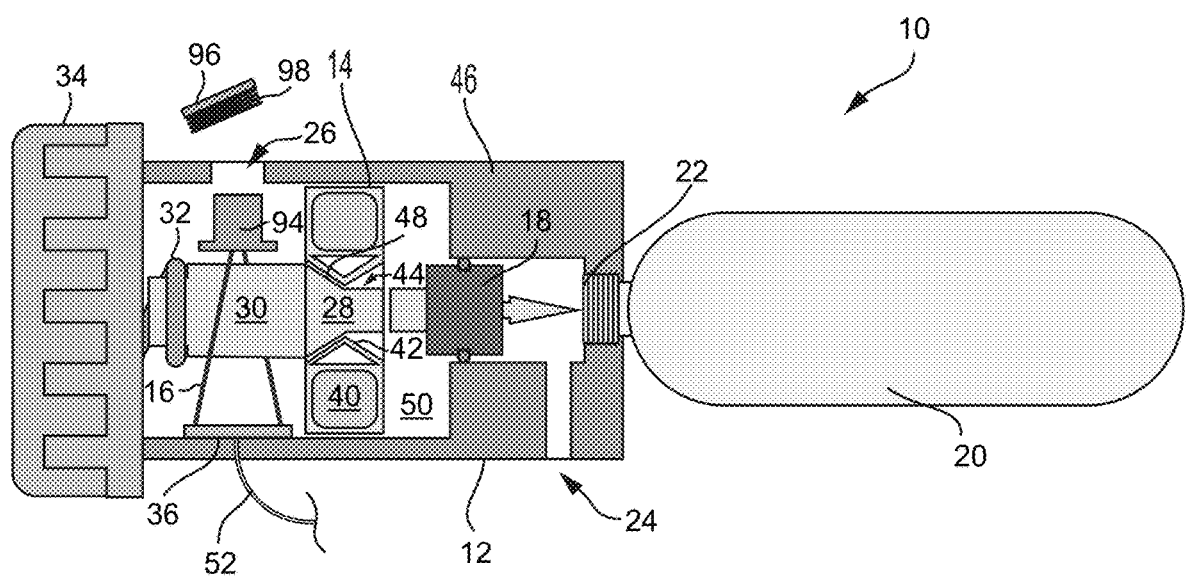
FIG. 11 illustrates a cross-sectional side view of the fifth example of an inflation device, including a shell, a pin, a restraining element, a moveable element in a second position, and an energy source.

FIG. 10 illustrates a cross-sectional side view of an example of the inflation device 10 while the moveable element 16 is in the first position. FIG. 11 illustrates a cross-sectional side view of the example of the inflation device 10 from FIG. 10, while the moveable element 16 is in the second position. In some embodiments, a plug 94 may be used to seal one or more water ports 26 while the moveable element 16 is in the first position. The plug 94 may be any component which is sized to fit within and seal the water port 26 to prevent fluid intrusion through the water port 26. Examples of the plug 94 may include a film, a stem, or a diaphragm. The plug 94 may include a plug cap 96 and packing 98 which may be coupled to the plug 94 to secure the plug 94 within the water port 26 and to prevent fluid intrusion through the water port 26. Examples of the plug cap 96 may include a bolt, a cover, or a film. Examples of the packing 98 may include an O-ring or a sealant gel coating. The plug cap 96 and packing 98 may be coupled to the plug 94 by a friction fitting or by an internal arrangement of slots and flanges.

In such an embodiment, the moveable element 16 may be positioned within the interior 50 of the shell 12. The moveable element 16 may be coupled to a board 36 or to the wall 46 of the shell 12. The moveable element 16 may be coupled to the wall 46 of the shell at a position within the interior 50 of the shell 12 which is opposed to the water port 26 occluded by the plug 94. The moveable element 16 may also be coupled to the plug 94.

As illustrated in FIG. 10, while the moveable element 16 is in the first position, the plug 94 may seal the water port 26. As the moveable element 16 shrinks from heating due to electrical resistance, the moveable element may exert a force on the plug 94. Eventually, as the moveable element 16 moves toward the second position, the force from the moveable element 16 may plug the plug 94 out of the water port 26 or may detach the plug cap 96 and packing 98 from the plug 94. After the plug 94 has been removed from the water port 26, fluid may enter the interior 50 of the shell 12, dissolving the restraining element 14, and allowing the piercing pin 18 to open the seal 22.

Figure 12:
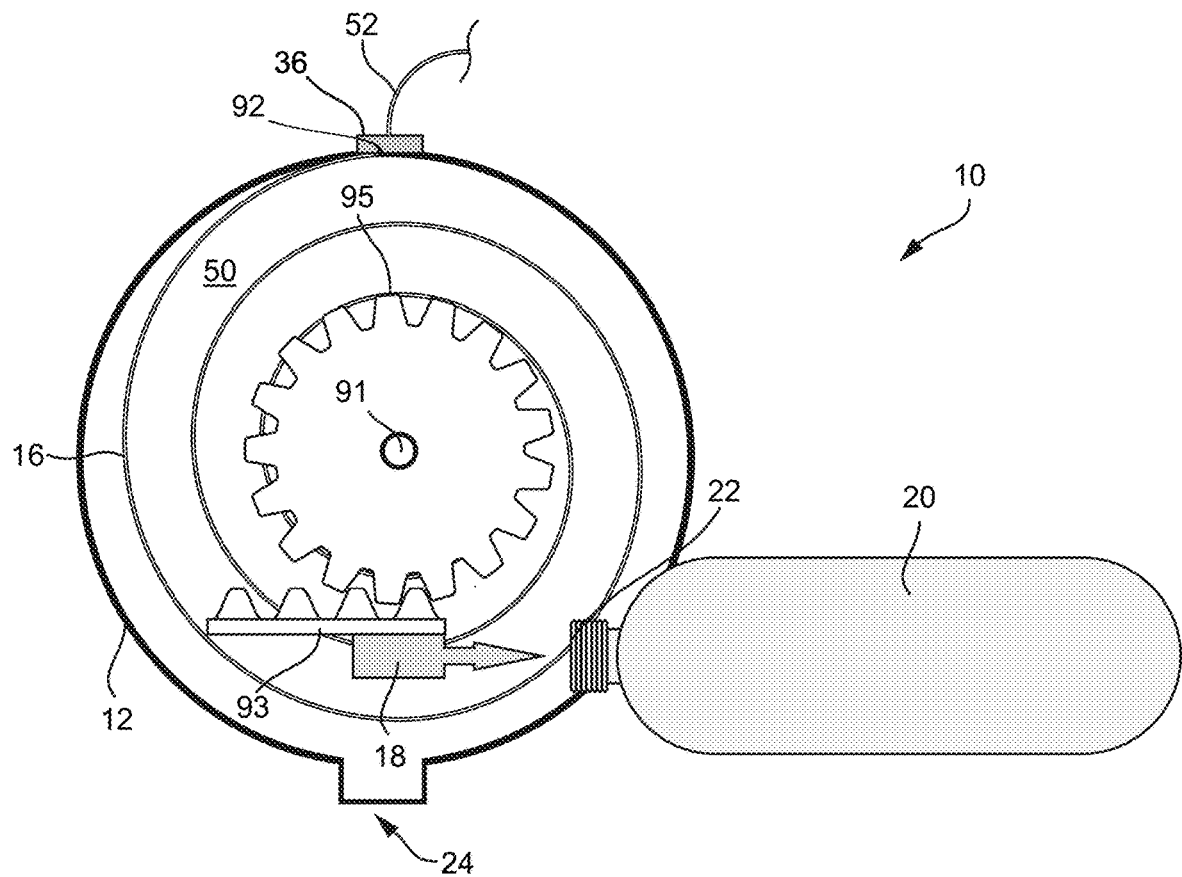
FIG. 12 illustrates a cross-sectional side view of the sixth example of an inflation device, including a shell, a pin, a restraining element, a moveable element, and an energy source.

FIG. 12 illustrates a cross-sectional side view of an example of the inflation device 10 while the moveable element 16 is in the first position. In some embodiments, the restraining element 14 may not be present. For example, as illustrated in FIG. 12, the moveable element 16 may be a coiled spring made from a shape memory alloy arranged within the shell and having one end 92 coupled to the wall 46 of the shell 12 and another end 92 coupled to a rotatable hub 91. The hub 91 may be located at or proximate to the center of the shell 12 and may be coupled to a pinion 95. The pinion 95 may be connected to a corresponding rack 93 through a set of intermeshing gears. The rack 93 may be coupled to the piercing pin 18, which is arranged proximate to the seal 22 of the inflation canister 20. As the moveable element 16 heats due to electrical resistance, the moveable element 16 may rotate from a first position to a second position, thereby rotating the hub 91 and pinion 95 relative to the shell 12. Rotation of the pinion 95 may drive the rack 93 and the connected piercing pin 18 to open the seal 22 of the inflation canister 20.

In some embodiments, such as in FIG. 12, the moveable element 16 may be unitary with the hub 91 and pinion 95. Furthermore, the piercing element 18 may be unitary with the rack 93, such that there is only one connection mechanical linkage between the moveable element 15 and the piercing pin 18. In other embodiments, such as those shown in FIGS. 2 and 3, the moveable element 16 may be coupled to the slider 89, such that there are only two mechanical linkages between the moveable element 16 and the piercing pin 18: (1) the linkage between the slider 89 to the restraining element 14, and the linkage between the restraining element 14 and the piercing pin 18.

Figure 13:
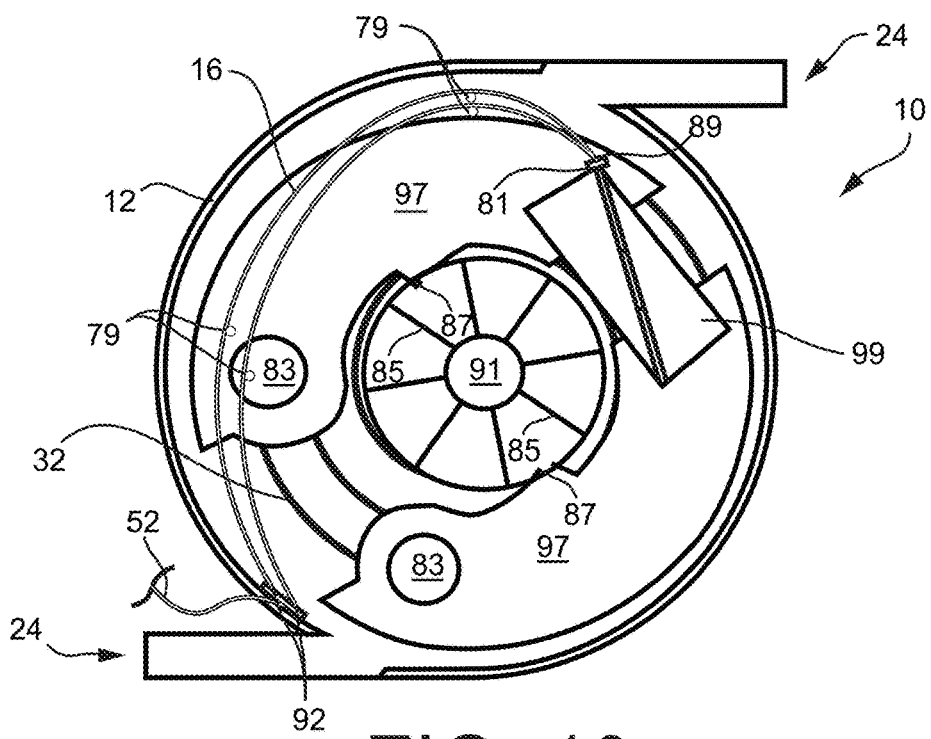
FIG. 13 illustrates a cross-sectional side view of the seventh example of an inflation device, including a shell, a pin, a restraining element, a moveable element, and an energy source.

FIG. 13 also illustrates an alternative embodiment of the inflation device 10 including two releasing arms 97 held together by a connecting component 99. As illustrated, the releasing arms 97 may include tabs 87 which interact with catches 85 in the hub 91 to prevent rotation of the hub 91. The releasing arms 97 may also include biased pivots 83 which bias the releasing arms 97 to retract the tabs 87 from the catches 85 when the connecting component 99 is released. The connecting component 99 may include two opposing portions coupled together by a rod 81 passing through openings in each portion of the connecting component 99. The hub 91 may be coupled to the piercing pin 18 (not shown in this embodiment) such that rotation of the hub 91 may cause the piercing pin to open the seal 22 of the inflation canister 20. The hub 91 may be under tension to rotate from a biasing mechanism 32 such as a spring coupled to the hub 91.

Figure 14:
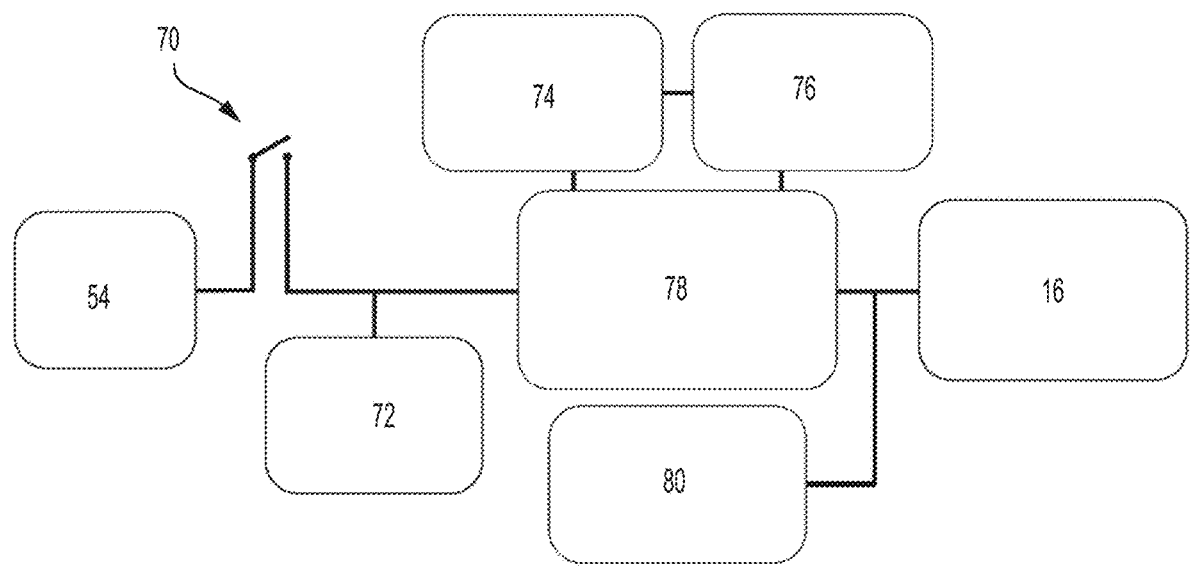
FIG. 14 illustrates a flow diagram of an example of an electrical system for an actuator, including a moveable element and an energy source.

The rod 81 may be coupled to the moveable element 16. The moveable element 16 may have an end 92 coupled to the board 36 or to the shell 16 and another end 92 or the apex 89 of the loop of the wire coupled to the rod 81. As illustrated in FIG. 14, the moveable element 16 may be a shape memory alloy wire which extends across a portion of the interior 50 of the shell 12 to couple the rod 81 to the shell 12. The path and movement of the moveable element 16 may be restricted by guides 79 placed about the interior 50 of the shell 12.

In the first position, the rod 81 couples the portions of the connecting component 99 together, preventing rotation of the hub 91 and thereby restraining the piercing pin 18 from opening the seal 22 of the inflation canister 20. As the moveable element 16 heats due to electrical resistance and retracts toward the second position, the moveable element 16 may exert a force on the rod 81 to pull the rod 81 out of the openings in the portions of the connecting component 99. Once the portions of the connecting component 99 have been decoupled, the releasing arms 97 may move, retracting the tabs 87 from the catches 85. Once the tabs 87 have been retracted from the catches 85, the hub 91 may be biased to spin from tension built up in the biasing mechanism 32. Rotation of the hub 91 may then induce the piercing pin 18 to open the seal 22 of the inflation canister 20.

FIG. 14 illustrates a flow diagram of an example of the electrical operations of the inflation device 10. The electrical energy source 54 may be separated from the other electrical components by an arming mechanism 70. The arming mechanism 70 may be any device which may be selectively opened or closed to respectively de-energize or energize the electrical components of the inflation device 10. Examples of the arming mechanism 70 may include a pull-tab, a button, or a clasp on a life vest. In some embodiments, the arming mechanism 70 may not be present, allowing at least some of the electrical components of the inflation device 10 to be energized constantly.

In some embodiments, closing the arming mechanism 70 may directly energize the moveable element 16, allowing the restraining element 14 to become unsecured. In such embodiments, moveable element 16 may protect the inflation device 10 from actuating in an unintended circumstance, such as in storage. However, if the moveable element 16 cannot be reset to the first position, the inflation device 10 may not be re-usable once the arming mechanism 70 has been closed.

In some embodiments, while the arming mechanism 70 is closed, a switching circuit 78 may be energized along with one or more sensors (74, 76). The switching circuit 78 may be any component which selectively energizes the moveable element 16 based on inputs received from the sensors (74, 76). Examples of the switching circuit 78 may include a micro-controller, a micro-processor, a threshold-based discriminator circuit, or a MOSFET circuit. The sensors (74, 76) may be any component which sense a condition external to the inflation device 10 and send inputs to the switching circuit 78. One or both of the sensors (74, 76) may indicate an actuation condition, causing the switching circuit 78 to energize the moveable element 16, thereby causing the moveable element 16 to move from the first position to the second position.

For example, in one embodiment a first sensor 74 may be a water pressure circuit, detecting the water pressure external to the inflation device 10, and a second sensor 76 may be a pair of water sensing electrodes, detecting the presence of water. In such an embodiment, the switching circuit 78 may be configured to energize the moveable element 16 only when both the first sensor 74 and the second sensor 76 are indicating an actuation condition, such as the presence of water and a sufficient water pressure.

In some embodiments, a capacitor 72 may also be included between the arming mechanism 70 and the switching circuit 78. The capacitor 72 may be any device which is electrically coupled to the electrical energy source 54, which stores electrical charge from the electrical energy source 54 and which may selectively deliver electrical charge to the moveable element 16. Examples of the capacitor 72 may include a double-layer supercapacitor or an electrochemical pseudocapacitor. Once the arming mechanism 70 has been closed, the capacitor 72 may begin charging from the electrical energy source 54. Once the switching circuit 78 has energized the moveable element 16, the capacitor 72 may rapidly discharge its stored electrical charge into the moveable element 16, allowing the moveable element 16 to rapidly heat up and transition the moveable element from the first position to the second position. The capacitor 72 may be charged slowly from the electrical energy source 54 and may be discharged quickly, allowing a smaller, lighter, and less expensive electrical energy source 54 to be used in the inflation device 10.

In some embodiments, the capacitor 72 may be used to accommodate a cheaper, more light weight electrical energy source 54 having lower voltage or amperage. For example, the electrical energy source 54 may be a coin battery providing only 20 milliamps and 3 volts. Once the arming mechanism 70 has been closed, the capacitor 72 may be trickle-charged by the electrical energy source 54 to ready the inflation device 10 for actuation. The capacitor 72 may also utilize a boost converter (not shown) adapted to step up voltage from the electrical energy source 54. For example, the boost converter may step up the 3 volts from the coin battery electrical energy source 54 to 5.4 volts within the capacitor 72. When the higher voltage electrical energy within the capacitor 72 is released into the moveable element 16, the electrical energy released may be between 5-10 joules delivered over 1-2 seconds, sufficient to transition the moveable element from the first position to the second position.

In some embodiments, an override switch 80 may be included. The override switch 80 may be any component capable of resetting the electrical components of the inflation device 10 or at least preventing energizing of the moveable element 16. Examples of override switch 80 may include a button or a toggle switch. In some embodiments, the switching circuit 78 may have a predetermined delay between detecting actuation conditions and energizing the moveable element 16. During this delay period, a light on the inflation device 10 may flash or a warning sound may play, alerting a user that the inflation device 10 is about to actuate. If the user does not wish the inflation device 10 to actuate, the override switch 80 may be used to prevent energizing of the moveable element 16. For example, use of the override switch 80 may prevent the switching circuit 78 from energizing the moveable element 16 or may open the arming mechanism 70. The override switch 80 may be used to prevent unintended actuation of the inflation device 10 and increase the potential for re-usability of the inflation device 10.

In some embodiments, every electrical component shown in FIG. 8 may be included on a single printed circuit board. In other embodiments, each component may be separated from each other, or may be grouped together on multiple printed circuit boards.

Furthermore, although specific components are described above, methods, systems, and articles of manufacture described herein may include additional, fewer, or different components. For example, some embodiments may have no water ports 26, or multiple water ports 26. Similarly, the restraining element 14 may not be present in some embodiments.

Figure 15:
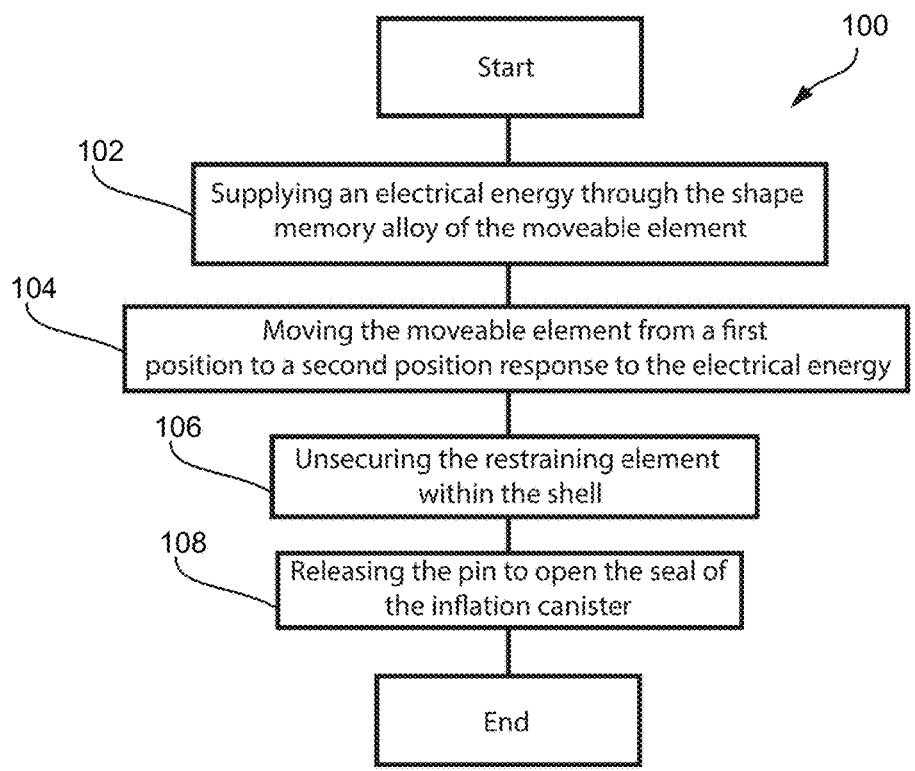
FIG. 15 illustrates a flow diagram of operations to activating an inflation device.

FIG. 15 illustrates a flow diagram of operations (100) to activate the inflation device 10. The operations may include fewer, additional, or different operations than illustrated in FIG. 13. Alternatively, or in addition, the operations may be performed in a different order than illustrated.

The operation of activating the inflation device 10 (100) may include supplying an electrical energy through the shape memory alloy of the moveable element 16 (102). The electrical energy may be provided from the electrical energy source 54. The electrical energy may meet electrical resistance within moveable element 16, heating the shape memory alloy, thereby moving the moveable element 16 from a first position to a second position. Movement of the moveable element 16 to the second position may unsecure the restraining element 14 (106), either by exposing it to fluid for dissolution or by moving the restraining element 14 out of the path of the piercing pin 18. After the restraining element 14 is unsecured, the operation may also include releasing the piercing pin 18 to open the seal of the inflation canister (108), thereby inflating an attached floatation device.

In addition to the advantages that have been described, it is also possible that there are still other advantages that are not currently recognized but which may become apparent at a later time. While various embodiments have been described, it will be apparent to those of ordinary skill in the art that many more embodiments and implementations are possible. Accordingly, the embodiments described herein are examples, not the only possible embodiments and implementations.

What is claimed is:

1. An inflation device comprising:
a shell adapted to be coupled to an inflation canister;
a pin positioned within the shell, wherein the pin is adapted to open a seal of the inflation canister;
a restraining element positioned within the shell;
a moveable element comprising a shape memory alloy, wherein the moveable element is moveable from a first position to a second position responsive to electrical energy sent to the moveable element, wherein while the moveable element is in the first position, the restraining element is secured within the shell to restrain the pin from opening the seal of the inflation canister, and wherein while the moveable element is in the second position, the pin is releasable to open the seal of the inflation canister.

2. The inflation device of claim 1, wherein the restraining element comprises a dissolvable bobbin arranged to prevent the pin from opening the seal of the inflation canister.

3. The inflation device of claim 2, wherein:
the shell comprises a port in a wall of the shell;
while the moveable element is in the first position the port is sealed to prevent fluid from entering the shell; and
while the moveable element is in the second position the port is open to permit fluid to enter an interior of the shell.

4. The inflation device of claim 3, further comprising a cap coupled to the shell and coupled to the moveable element, wherein while the moveable element is in the first position the cap seals the port to prevent fluid from entering the shell, and while the moveable element is in the second position the cap opens the port to permit fluid to enter an interior of the shell.

5. The inflation device of claim 4, wherein the moveable element comprises a coil having a first end coupled to the shell and a second end coupled to the cap.

6. The inflation device of claim 3, further comprising a plug coupled to the moveable element and sized to fit within and seal the port, wherein while the moveable element is in the first position the plug is positioned to seal the port to prevent fluid from entering the shell, and while the moveable element is in the second position the plug is positioned out of the port to permit fluid to enter an interior of the shell.

7. The inflation device of claim 6, wherein the moveable element comprises a wire extending between the plug and the shell at a position within the interior of the shell which is opposed to the port.

8. The inflation device of claim 1, wherein the restraining element is translateable from an interior of the shell to an exterior of the shell through a port in a wall of the shell.

9. The inflation device of claim 8, wherein:
the moveable element is arranged against the exterior of the shell;
the moveable element comprises a barrier portion and a recess portion;

while the moveable element is in the first position, the barrier portion covers the port to prevent translation of the restraining element out of the interior of the shell; and while the moveable element is in the second position, the recess portion is positioned alongside the port to allow translation of the restraining element out of the interior of the shell.

10. The inflation device of claim 9, wherein the moveable element comprises:
a board extending from a first end to the second end;
a wire made from a shape memory alloy, the wire forming a U-shape and extending from the first end of the board to the second end of the board; and
a slider including the recess portion and the barrier portion of the moveable element, wherein the slider is coupled to the board and to the wire and is moveable from a first position to the second position responsive to expansion or contraction of the wire.

11. The inflation device of claim 10, wherein the wire is coupled to an electrical wire at a first end and the slider at a second end, and a length between the first end and the second end is no more than twenty-five times a moveable distance of the slider between the first position and the second position.

12. An inflation device comprising:
a shell adapted to be coupled to an inflation canister;
a pin positioned within the shell, wherein the pin is adapted to open a seal of the inflation canister; and
a moveable element comprising a shape memory alloy, wherein the moveable element is moveable from a first position to a second position responsive to electrical energy sent through the moveable element, wherein while the moveable element is in the first position, the pin is restrained from opening the seal of the inflation canister, and wherein while the moveable element is in the second position, the pin is moveable within the shell independently from the moveable element to open the seal of the inflation canister.

13. The inflation device of claim 12, wherein the moveable element is coupled to the pin and the moveable element is arranged to force the pin through the seal of the inflation canister when the moveable element is moved to the second position.

14. The inflation device of claim 12, further comprising a biasing mechanism coupled to the pin, wherein, in the first position, the moveable element is arranged to prevent the biasing mechanism from pushing the pin into the seal of the inflation canister, and in the second position, the moveable element is arranged to allowing the biasing mechanism to push the pin into the seal of the inflation canister.

15. The inflation device of claim 14, wherein the biasing mechanism is arranged to deliver at least 50 pounds of force to the pin while the moveable element is in the second position.

16. The inflation device of claim 12, wherein the moveable element comprises a nitinol wire.

17. The inflation device of claim 12, wherein the moveable element is moveable from the first position to the second position responsive to no greater than 10 joules of electrical energy sent through the moveable element.

18. A method of activating an inflation device comprising an inflation canister, a shell coupled to the inflation canister, a pin positioned within the shell and adapted to open a seal of the inflation canister, a restraining element secured within the shell to restrain the pin from opening the seal, and a moveable element comprising a shape memory allow, the method comprising:
supplying an electrical energy through the shape memory alloy of the moveable element;
moving the moveable element from a first position to a second position responsive to the electrical energy;
unsecuring the restraining element within the shell; and
releasing the pin to open the seal of the inflation canister.

19. The method of claim 18, wherein supplying the electrical energy to the moveable element comprises supplying no more than 10 joules of electrical energy over no more than 1 seconds.

20. The method of claim 18, further comprising charging a capacitor electrically coupled to the moveable element, wherein supplying the electrical energy to the moveable element comprises discharging the capacitor through the moveable element.

* * * * *